Jan. 12, 1926.
J. M. CREASON
1,569,720
DIRIGIBLE HEADLIGHT
Filed April 4, 1925
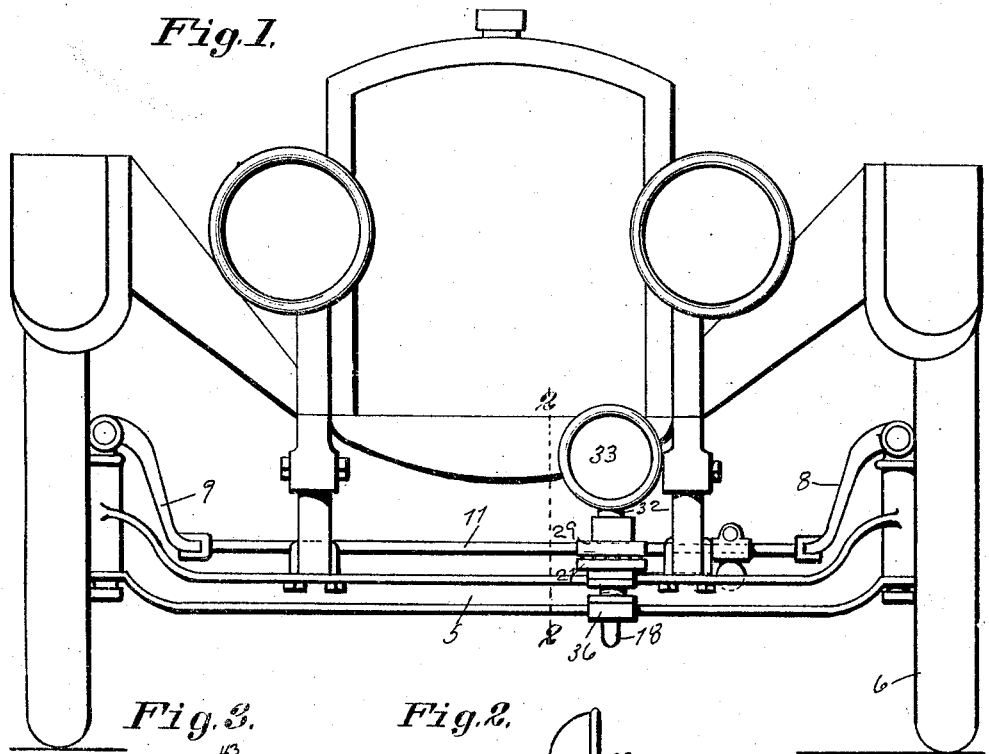
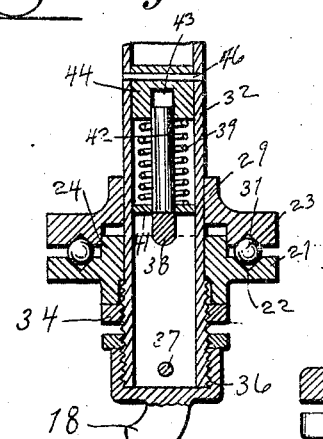
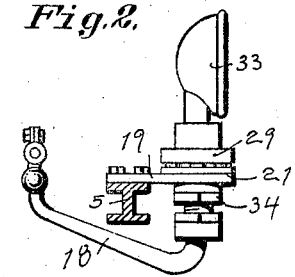
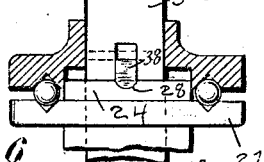
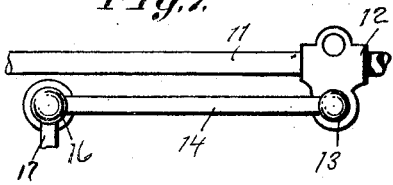
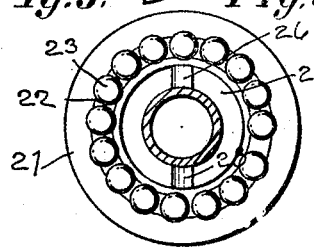
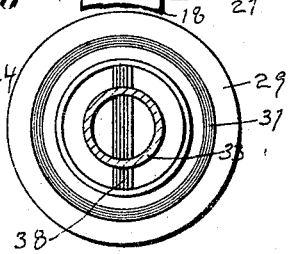
Inventor.
James M. Creason
By Victor J. Evans
Attorney.

Patented Jan. 12, 1926.

1,569,720

UNITED STATES PATENT OFFICE.

JAMES M. CREASON, OF WEED, CALIFORNIA.

DIRIGIBLE HEADLIGHT.

Application filed April 4, 1925. Serial No. 20,782.

*To all whom it may concern:*

Be it known that I, JAMES M. CREASON, a citizen of the United States, residing at Weed, in the county of Siskiyou and State of California, have invented new and useful Improvements in Dirigible Headlights, of which the following is a specification.

This invention relates to improvements in dirigible headlights and has particular reference to a headlight which will turn with the direction of travel of the vehicle to which the device is attached.

The principal object of this invention is to produce a headlight which may be connected to the steering mechanism of the vehicle in such a manner as to project the beams of light either to the right, or the left according to the direction of travel of the vehicle.

Another object is to produce a device of this character which is simple in construction and therefore cheap to manufacture.

Another object is to produce a device which may be attached to the ordinary automobile for instance, without altering the construction of the same.

A further object is to produce a device of this character wherein a slight variance in the steering of the vehicle will not affect the device.

Other objects and advantages will be apparent during the course of the following description.

In the accompanying drawings forming a part of this specification, and in which like numerals are employed to designate like parts throughout the same, Figure 1 is a front elevation of an automobile having my device attached thereto, Figure 2 is a detail view showing the connecting means between the light and the steering mechanism, Figure 3 is a vertical cross-section showing the manner of supporting my dirigible light, Figure 4 is a side elevation of the supporting bracket having the top plate in cross section.

Figure 5 is a top plan view of the bottom supporting member,

Figure 6 is a plan view of the top supporting member.

Figure 7 is a fragmentary view showing the manner of connecting my device to the steering mechanism.

It is my intention to produce a device which when a distinct turn is being made, will cause the light beams to project either to the right or to the left and to later maintain the light, so that under ordinary driving conditions the beams will be straight ahead and stationary with respect to the conveyance.

In the accompanying drawings wherein for the purpose of illustration is shown a preferred embodiment of my invention, the numeral 5 designates the front axle of an automobile having wheels 6 and 7. These wheels are connected by the customary steering knuckles 8 and 9, respectively, to a cross rod 11. To this cross rod I connect a bracket 12 having a ball joint 13 within which is mounted the ball of a connecting link 14 having a similar ball joint 16 at its opposite end, to which is connected the arm 17 of the turning lever of my light.

Positioned on the axle 5 is a plate 19 which carries a supporting member 21 within which is formed a ball race 22 so as to accommodate balls 23. This supporting member is provided with an upstanding annular rim 24 within which is formed depressions 26 and 27, which are diametrically opposite each other.

Positioned upon the balls 23 is an upper supporting member 29 which has a ball race 31 adapted to engage the balls 23. The tubular light stem is shown at 32, which stem has positioned at its upper end a light 33, while its lower extremity passes through the supports 29 and 21 and is threadedly engaged by a retaining nut 34, while the upper support 29 is preferably welded to the stem 32. The lever 18 also threadedly engages the bottom of the stem as shown at 36 and has a pin 37 extending therethrough so as to prevent any possible movement between the two parts.

At 38 I have shown a key extending through the stem 32 and adapted to have its opposite ends normally resting in the depressions 26 and 28.

A spring 39 positioned within the stem 32 normally presses upon a guide washer 41, which rests upon the top of the guide key 38. A guide pin 42 is preferably formed integral with the key 38 and has its upper extremity positioned in a bore 43 formed in a plug 44, pinned as shown at 46 within the stem 32.

The result of this construction is that when the device is attached to an automobile in the manner shown in Figure 1, the slight movement of the supporting mechanism will not be sufficient to cause the light 33 to be moved due to the presence of considerable lost motion placed in the ball joints 13 and 16. When however, the driver of the machine turns the wheels to any appreciable angle, the lever 18 in traveling with the wheel movement will cause the key 38 to rise out of its depressions 26 and 28 because the tension of the spring 39 causes the actions. At this time the key will ride upon the top of the annular rim 24. When the steering mechanism has again been returned to a straight ahead position, the key 38 will again return to its depressions and the stem will be held against undue movement until the driver is again ready to make a turn.

It will thus be seen that I have produced a simple mechanism which may be attached to any automobile or other vehicle and one which will not permit the light to wobble unnecessarily, but one which will cause the light to be moved in an appreciable deviation from the straight ahead direction being taken.

It is to be understood that the form of my invention herewith shown and described is to be taken as a preferred example of the same, and that various changes in the shape, size and arrangement of parts may be resorted to without departing from the spirit of the invention or the scope of the subjoined claim.

Having thus described my invention, I claim:—

In a device of the character described, a support having an upstanding rim, said rim having depressions formed therein, a tubular stem extending through said support and a key longitudinally positioned in said stem and having its opposite ends normally bearing in said depressions, a spring positioned within said stem and bearing on said key, means for limiting the upward movement of said spring, a second support position on said stem and secured thereto, said second support being spaced from said first mentioned support, anti-friction means interposed between said supports, and a lever secured to the lower extremity of said stem for the purpose of rotating said stem so as to cause said key to move out of said depressions, for the purpose specified.

In testimony whereof I affix my signature.

JAMES M. CREASON.